(12) United States Patent
Kushida (10) Patent No.: US 7,444,076 B2
(45) Date of Patent: Oct. 28, 2008

(54) IMAGE DEVICE AND METHOD FOR DRIVING OPTICAL SYSTEM

(75) Inventor: Hidenori Kushida, Tokyo (JP)

(73) Assignee: Sony Corporation (JP)

( * ) Notice: Subject to any disclaimer, the term of this patent is extended or adjusted under 35 U.S.C. 154(b) by 522 days.

(21) Appl. No.: 11/202,095

(22) Filed: Aug. 12, 2005

(65) Prior Publication Data

US 2006/0056833 A1     Mar. 16, 2006

(30) Foreign Application Priority Data

Aug. 30, 2004   (JP)   ............... 2004-250733

(51) Int. Cl.
  G03B 17/00   (2006.01)
  G03B 7/10   (2006.01)
(52) U.S. Cl. .................. 396/259; 396/75
(58) Field of Classification Search ............ 396/75, 396/77, 80, 87, 259; 348/345, 347, 349, 348/350, 352, 354
See application file for complete search history.

(56) References Cited

U.S. PATENT DOCUMENTS

| 5,455,649 | A |   | 10/1995 | Yamada et al. |
| 5,897,227 | A |   | 4/1999 | Haraguchi et al. |
| 5,930,054 | A | * | 7/1999 | Kasuya .................. 359/698 |
| 6,097,548 | A |   | 8/2000 | Funahashi et al. |
| 6,377,752 | B1 | * | 4/2002 | Ishii ..................... 396/87 |
| 6,954,589 | B2 | * | 10/2005 | Okawara ................. 396/87 |

| 2001/0007472 | A1 |   | 7/2001 | Nishimura |
| 2001/0055481 | A1 | * | 12/2001 | Yoshikawa et al. ........... 396/89 |
| 2003/0197803 | A1 | * | 10/2003 | Watanabe et al. ........... 348/345 |

FOREIGN PATENT DOCUMENTS

| JP | 59-216111 | 12/1984 |
| JP | 63-177118 | 7/1988 |
| JP | 10-274737 | 10/1998 |

OTHER PUBLICATIONS

European Search Report mailed on Jul. 10, 2006.
Japanese Office Action dated Mar. 25, 2008 for corresponding Japanese Application No. 2004-250733.

* cited by examiner

Primary Examiner—Rodney E Fuller
(74) Attorney, Agent, or Firm—Rader Fishman & Grauer PLLC; Ronald P. Kananen (57) ABSTRACT

An imaging device for picking up an image of an object via an optical system and recording image information in a recording medium, a driving system for the optical system being controlled according to a position of an operating unit, includes a motor driving an object to be controlled by the driving system, a driver driving the motor, an absolute position detector detecting a relatively-low-resolution absolute position of the operating unit, a relative position detector detecting a relatively-high-resolution relative position of the operating unit, a position generator, and a controller. The position generator generates a position output corresponding to a position in a restricted range of movement of the operating unit using a combination of the detected absolute position and the detected relative position. The controller controls the motor via the driver to drive the object to be controlled according to the generated position output of the operating unit.

7 Claims, 8 Drawing Sheets

IMAGE DEVICE AND METHOD FOR DRIVING OPTICAL SYSTEM

CROSS REFERENCES TO RELATED APPLICATIONS

The present invention contains subject matter related to Japanese Patent Application JP 2004-250733 filed in the Japanese Patent Office on Aug. 30, 2004, the entire contents of which are incorporated herein by reference.

BACKGROUND OF THE INVENTION

1. Field of the Invention

The present invention relates to an imaging device in which a lens driving system is controlled during imaging, and to a method for driving an optical system.

2. Description of the Related Art

Recently, camera drive systems of the open-loop control method in which a stepping motor serves as an actuator have been widespread. Such a control mechanism provides high positioning resolution and achieves high positioning accuracy on the order of several micrometers (μm).

In one known camera drive system, when a motor drives a lens, an operation control unit detects the state of an operating member and controls the motor according to the detected state or the calculated amount. The operating member is implemented as, for example, a lever/ring the middle of whose operating range is the natural restoration point (see Japanese Unexamined Patent Application Publication No. 59-216111) or a rotating ring (see Japanese Unexamined Patent Application Publication No. 63-177118). Such control performed by the operation control unit improves the positioning accuracy with which the lens is controlled; and the need for rings that allow for a higher-resolution operation has increased.

In lens mechanisms (typically used for business purposes, etc.) in which a ring and a lens are mechanically connected and the lens moves forward or backward in a lens barrel depending on the amount of rotation of the ring, the angle of rotation of the ring is limited in association with the maximum forward or backward position of the lens in the lens barrel. In addition, the angle of rotation of the ring and the lens position are in one-to-one correspondence. Such lens mechanisms are therefore intuitive and easy-to-operate.

Lens position detection systems with a resolution as high as operating rings also have been demanded.

Existing lens position determination methods include the following types.

A first type is the type in which the absolute position is determined using a hall sensor, a potentiometer, or the like.

A second type is the type in which with the use of a reset sensor for detecting a reference position and a frequency generator (FG) pulse counter for counting pulses from the reference position, or the reset sensor and a magnetoresistive (MR) sensor, or the like, the relative position from the reference position is determined using the reset sensor/encoder combination (see Japanese Unexamined Patent Application Publication No. 59-216111, noted above).

A third type is the in which that a plurality of reference positions are detected using a plurality of reset sensors, e.g., two reset sensors, three reset sensors, etc.

SUMMARY OF THE INVENTION

When the above-described lens mechanism in which a ring and a lens are mechanically connected is applied to an inner focusing lens, the complexity in structure increases, and it is difficult to provide a one-to-one correspondence between the movable range of the ring and the movable range of the lens. It is therefore difficult to determine intuitively whether the object to be controlled (i.e., the inner focusing lens) has reached the movable end.

In the second lens-position determination method, a relative position sensor detects the amount of rotation of the operating ring using a displacement sensor, such as a two-phase pulse encoder. This relative position sensor has a problem in that when the angle of rotation of the operating ring is limited, it is difficult to determine the ring position immediately after the camera is turned on. In order to overcome this problem, the amount of relative movement is determined based on the state immediately after the camera is turned on, and the ring allows infinite rotation. Thus, it is difficult to provide a one-to-one correspondence between the movable range of the ring and the movable range of the lens, and it is therefore difficult to determine intuitively the amount of control.

In the first lens-position determination method, it is possible to determine the amount of rotation of the operating ring using the output of an absolute position sensor, such as a potentiometer. However, due to its typical restrictions, such as low resolution and high susceptibility to noise, the absolute position sensor is not suitable for smooth or fine movement of the lens.

The third lens-position determination method using a plurality of reset sensors has the drawback of low resolution due to mechanical restrictions, such as installation positions of the plurality of reset sensors.

It is therefore desirable to provide an imaging device that easily determines the amount of control and that performs control to smoothly drive an object to be controlled and to provide a method for driving an optical system.

An imaging device according to an embodiment of the present invention includes the following elements. A motor drives an object to be controlled by a driving system. A driver drives the motor. Absolute position detecting means detects a relatively-low-resolution absolute position of an operating unit. Relative position detecting means detects a relatively-high-resolution relative position of the operating unit. Position generating means generates a position output corresponding to the position of the operating unit using a combination of the absolute position detected by the absolute position detecting means and the relative position detected by the relative position detecting means; control means controls the motor via the driver to drive the object to be controlled according to the generated position output of the operating unit.

Therefore, with the use of both the absolute position detecting means with low resolution and the relative position detecting means with high resolution, with respect to the operating unit whose angle of rotation (movable range) is physically restricted, both detection of the absolute angle of rotation and high-resolution detection of the amount of rotation can be achieved.

The position generating means may initialize a value in a storage region storing the generated position output based on the absolute position detected by the absolute position detecting means. After the initialization, the position generating means may increase or decrease the value in the storage region based on a signal from the relative position detecting means.

The position of components of the optical system, such as a zoom lens and a focus lens or an iris of the imaging device, also may be controlled based on the value in the storage region in the position generating means.

A method for driving an optical system according to an embodiment of the present invention includes the steps of detecting a relatively-low-resolution absolute position of an operating unit, detecting a relatively-high-resolution relative position of the operating unit, generating a position output corresponding to a position of the operating unit using a combination of the absolute position detected in the step of detecting the absolute position and the relative position detected in the step of detecting the relative position, controlling a motor via a driver to drive an object to be controlled by a driving system according to the generated position output of the operating unit, and driving the object to be controlled by the driving system using the motor.

Therefore, with the processing using both steps of detecting the relatively-low-resolution absolute position and detecting the relatively-high-resolution relative position, with respect to the operating unit whose angle of rotation (movable range) is physically restricted, both detection of the absolute angle of rotation and high-resolution detection of the amount of rotation can be achieved.

In the step of generating a position output, a value in a storage region storing the generated position output may be initialized based on the absolute position detected in the step of detecting the absolute position, and, after the initialization, the value in the storage region may be increased or decreased based on a signal output in the step of detecting the relative position.

The positions of components of the optical system, such as a zoom lens and a focus lens or an iris of an imaging device, also may be controlled based on the value in the storage region in the step of generating a position output.

According to an embodiment of the present invention, therefore, the position of an operating ring whose angle of rotation is physically restricted can be determined using a sensor for detecting the absolute position and a sensor for detecting the amount of relative movement in order to achieve a determination of the absolute angle of rotation and a high-resolution detection of the position of the ring.

Therefore, with respect to a ring whose angle of rotation is restricted, of which the amount of control can be determined intuitively, fine and smooth manual operation of a lens, etc., can be performed. Moreover, even if the ring is rotated when applying no current, the angle of rotation of the ring can be detected when the imaging device is turned on.

DESCRIPTION OF THE PREFERRED EMBODIMENTS

An embodiment of the present invention will be described in detail hereinbelow with reference to the drawings.

Figure 1:
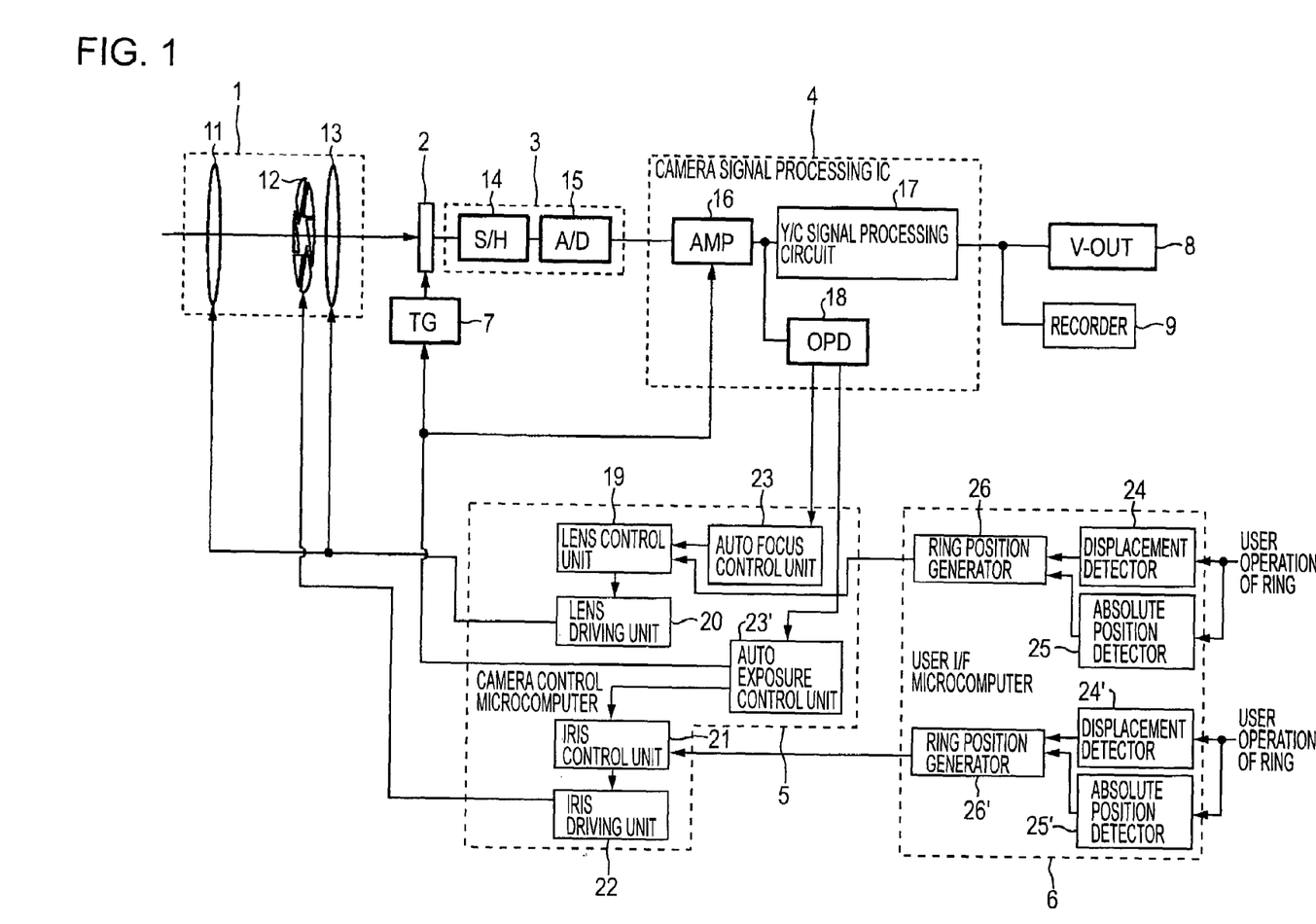
FIG. 1 is a block diagram of an imaging device according to an embodiment of the present invention.

FIG. 1 is a block diagram schematically showing the structure of an imaging device according to an embodiment of the present invention.

In FIG. 1, an imaging lens and iris block 1 serves as an optical system, and the system includes an iris 12 that is adjustable to control the amount of light with respect to an objective lens and a lens housing accommodating a focus lens 13 in a manner capable of performing a focusing operation and a zoom lens 11 in manner capable of performing zoom-in and zoom-out operations.

An imaging element 2 is disposed along the optical axis of the imaging lens and iris block 1. An image signal that is photoelectrically converted by the imaging element 2 is sampled and held at a predetermined timing by a sample-hold circuit 14 in a sample-hold and analog-to-digital conversion block 3, and it is then converted into digital image data by an analog-to-digital conversion circuit 15.

The digital image data is amplified by an amplification circuit 16 in a camera signal processor block 4 to a level capable of signal processing, and the amplified digital image data is subjected to luminance and chrominance signal processing by a luminance and chrominance signal processing circuit 17. The resulting data is output to a video output unit 8 or a recorder 9.

The digital image data amplified by the amplification circuit 16 to the level capable of signal processing also is supplied to a luminance signal detection circuit 18 to detect a luminance signal level and a high-frequency luminance signal component. In a camera control block 5, an automatic exposure control unit 23' performs exposure control depending on the luminance signal level, and an automatic focus control unit 23 performs focus control depending on the high-frequency luminance signal component.

Specifically, the amount of light passing through the iris 12, the photoelectric conversion timing for the imaging element 2 from a timing generation circuit 7, and the amplification level of the amplification circuit 16 are controlled based on an exposure control signal from the automatic exposure control unit 23'.

Based on a focus control signal from the automatic focus control unit 23, the position of the focus lens 13 is controlled by a lens control unit 19 and a lens driving unit 20.

In response to an input to a user interface control block 6 by a user operation of an operating ring, a displacement detector 24 and an absolute position detector 25 detect an amount of relative displacement and an absolute position, respectively, as described below. The amount of relative displacement and the absolute position output from the displacement detector 24 and the absolute position detector 25 are supplied to a ring position generator 26. The ring position generator 26 generates a ring position output by combining the amount of relative displacement and the absolute position.

The ring position output is supplied to the lens control unit 19 in the camera control block 5, and the lens control unit 19 generates a lens control signal based on the ring position output. The lens control signal is supplied to the lens driving unit 20, and the lens driving unit 20 drives the focus lens 13 and the zoom lens 11 based on the lens control signal.

Figure 2:
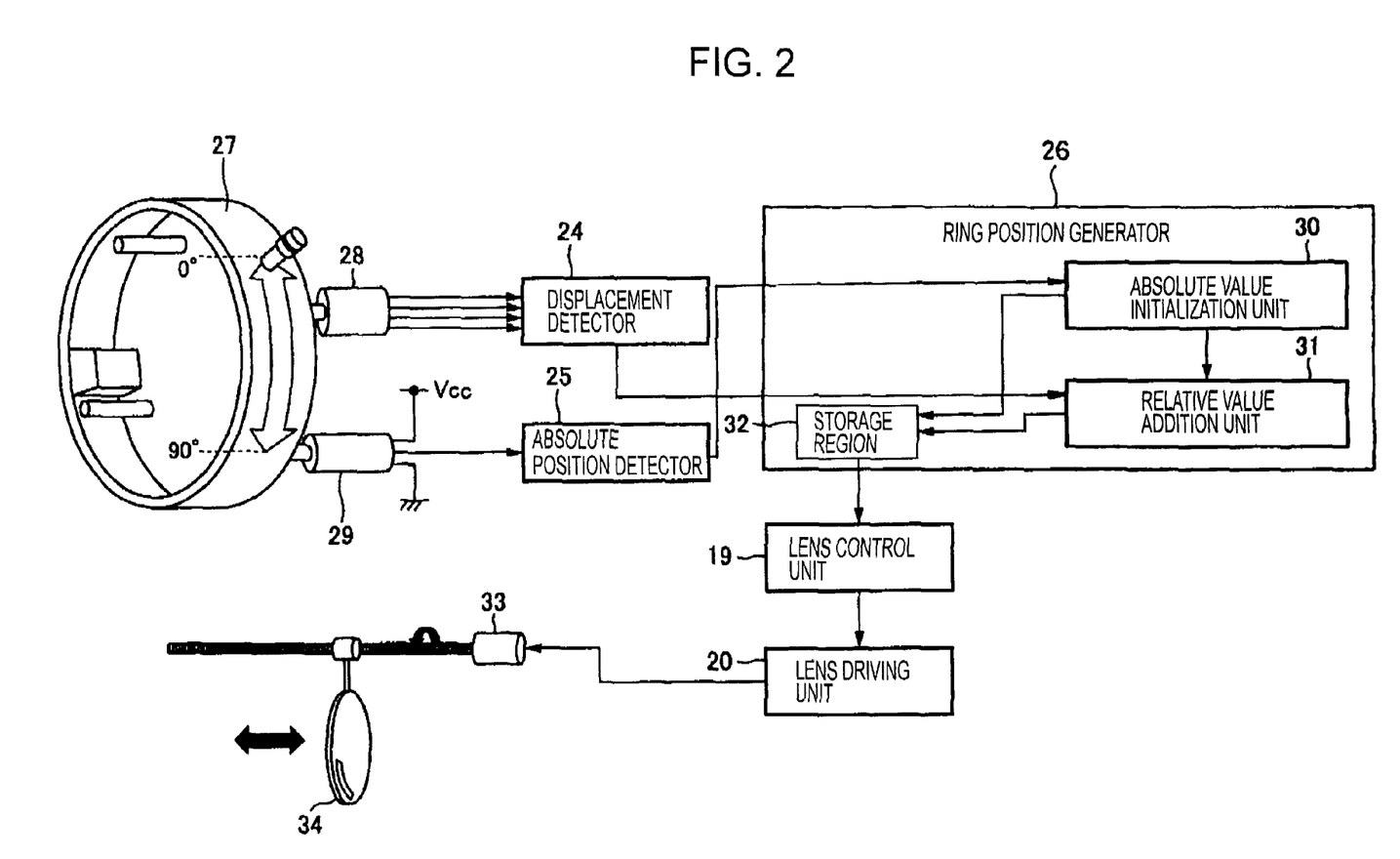
FIG. 2 is a diagram of a lens driving system to show the lens driving operation of a ring position generator.

FIG. 2 is a diagram of a lens driving system using an operating ring, showing the lens driving operation of a ring rotation position generator.

In FIG. 2, a ring 27 has an angle of rotation that is restricted to a range of movement from 0 degrees to about 90 degrees. For convenience of illustration, the upper end and the lower end of the ring 27 are 0° and 90°, respectively. When the ring 27 is rotated by a user operation, a rotary MR encoder 28 and a rotary potentiometer 29 rotate about the rotation axes via gears followed by the ring 27.

Figure 4:
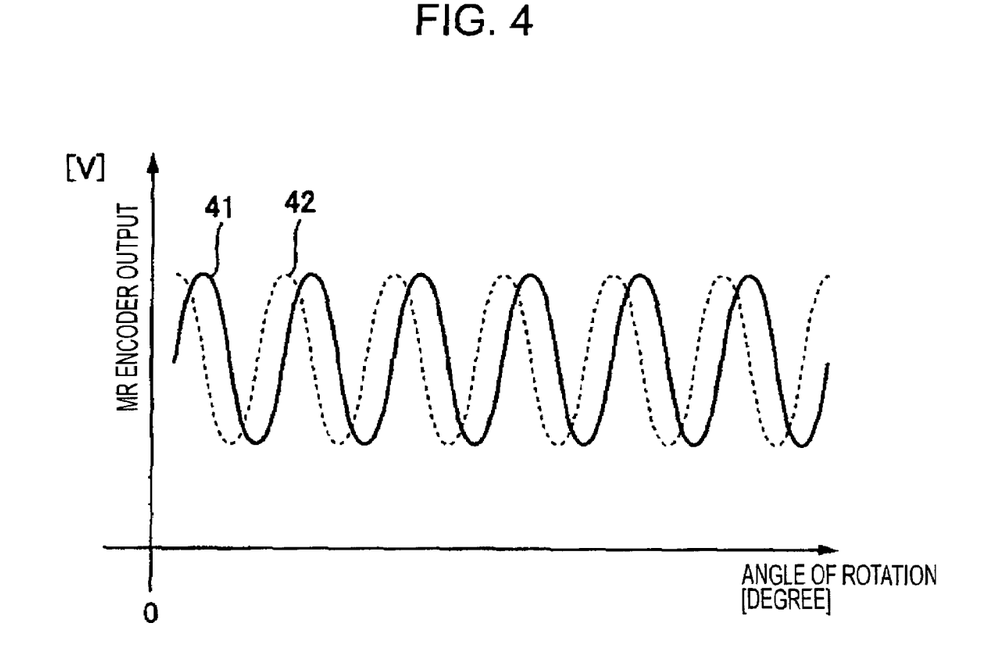
FIG. 4 is a diagram showing a MR encoder output.

An output of the MR encoder 28 is processed in the displacement detector 24. The output of the MR encoder 28 is represented by, for example, 90° out-of-phase two-phase sine waves 41 and 42, as shown in FIG. 4. The displacement detector 24 determines the amount of movement and the movement direction from voltage outputs of a series of linear portions of the sine waves 41 and 42 with respect to the angle on the basis of the voltage of each phase and the phase relation. The output of the MR encoder 28 largely changes even with a slight rotation of the ring 27. The displacement detector 24 therefore can provide high-resolution detection of the amount of rotation.

For the convenience of illustration, the MR encoder 28 has a resolution of 0.001°. If the amount of displacement of the MR encoder 28 detected by the displacement detector 24 is indicated by $\Delta R$ and the amount of displacement of the ring 27 is indicated by $\Delta\theta$, the relationship between the values $\Delta R$ and $\Delta\theta$ is determined by Eq. 1:

$$\Delta\theta = \Delta R \times \alpha \qquad \text{Eq. (1)}$$

where $\alpha$ denotes a constant.

The value $\Delta\theta$ is set as the output of the displacement detector 24.

Figure 5:
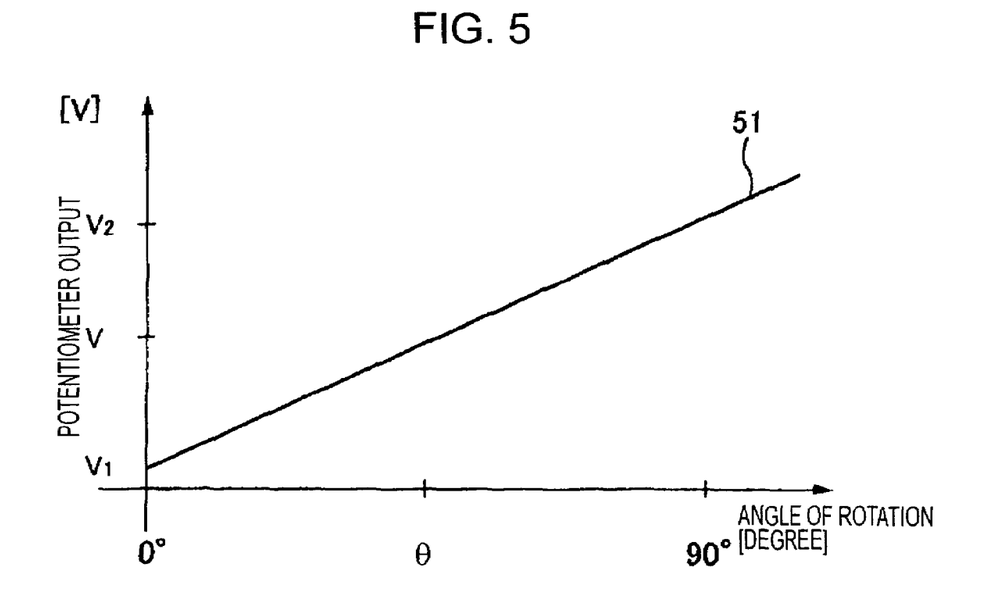
FIG. 5 is a diagram showing a linear potentiometer output.

An output of the potentiometer 29 is processed in the absolute position detector 25. For example, when the output of the potentiometer 29 has a linear characteristic 51 shown in FIG. 5, if the voltage with respect to an angle of 0° is indicated by V1 and the voltage with respect to an angle of 90° is indicated by V2, the angle of rotation $\theta$ of the ring 27 with respect to an output voltage V is determined by Eq. (2):

$$\theta = 90 \times (V - V1)/(V2 - V1) \qquad \text{Eq. (2)}$$

Figure 6:
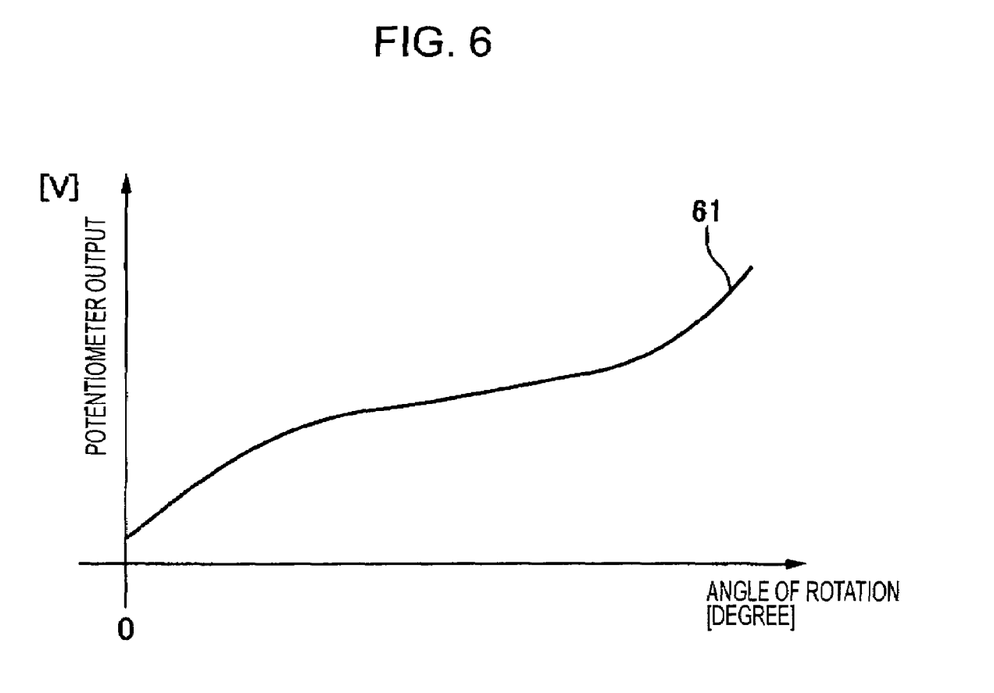
FIG. 6 is a diagram showing a non-linear potentiometer output.

When the output of the potentiometer 29 has a non-linear characteristic 61, as shown in FIG. 6, the non-linear output 61 is corrected using a linear correction function g(x) and the angle of rotation $\theta$ is determined by Eq. (3):

$$\theta = 90 \times (g(V) - g(V1))/(g(V2) - g(V1)) \qquad \text{Eq. (3)}$$

The function g(x) is configurable using a function expressed as a polynomial or a table including the correspondence between the output and the angle of rotation. The determined angle of rotation $\theta$ is set as the output of the absolute position detector 25.

The resolution with which the absolute position detector 25 detects the absolute position using the output of the potentiometer 29 is substantially not high because the amount of voltage change due to the noise, etc., of the potentiometer 29 directly affects the position accuracy. For the convenience of illustration, the resolution of the potentiometer 29 is 0.5°.

The lens driving operation performed with this configuration will be described hereinbelow.

Figure 9:
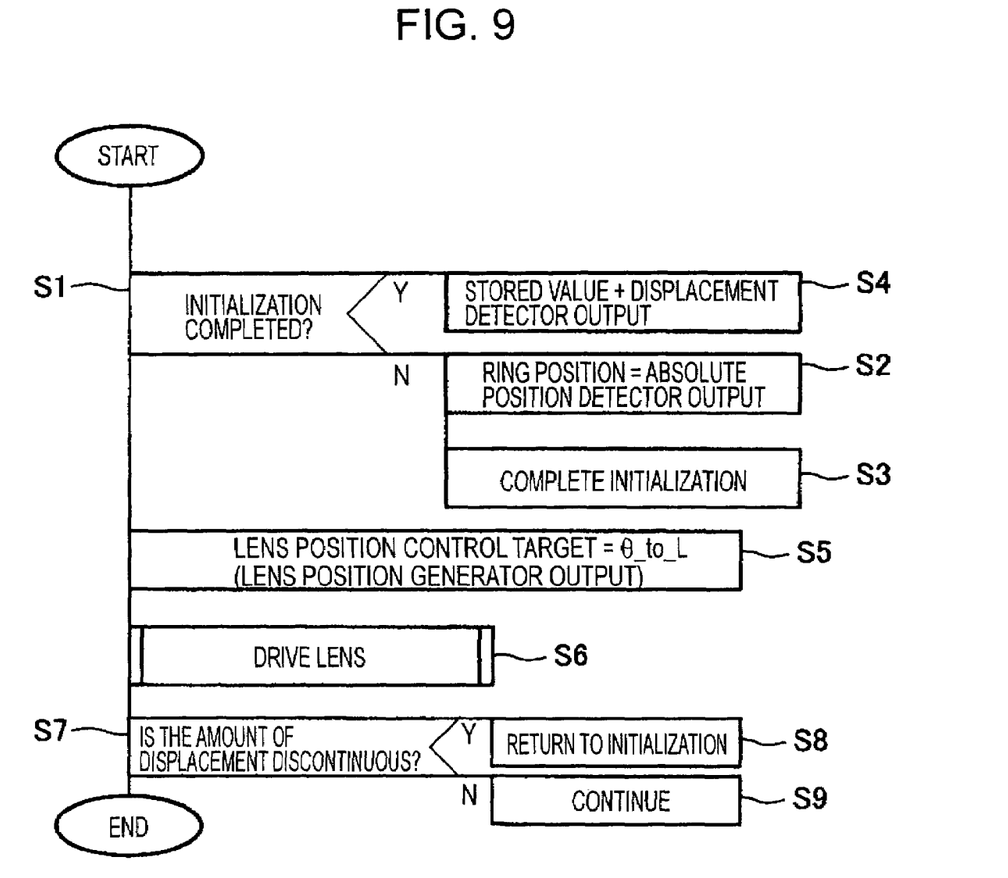
FIG. 9 is a PAD diagram showing the lens driving operation.

FIG. 9 is a PAD diagram showing a flow of lens driving operation steps that are executed by microcomputers in the user interface control block 6 and the camera control block 5 shown in FIG. 1.

In FIG. 9, first, it is determined whether or not initialization is completed (step S1). If it is determined in step S1 that initialization is not completed, the ring position is set as the absolute position detector output (step S2), and initialization is completed (step S3). Specifically, the ring position generator 26 has a storage region 32 when the ring position generator 26 generates a value corresponding to the angle of rotation of the ring 27. Thus, the storage region 32 stores the value corresponding to the angle of rotation of the ring 27. If the storage region 32 is not defined, for example, when the imaging device is turned on, an absolute value initialization unit 30 in the ring position generator 26 initializes the storage region 32 using the angle of rotation detected by the absolute position detector 25.

If it is determined in step S1 that initialization is completed, the displacement detector output is added to the ring position (step S4). Specifically, for example, the angle of rotation detected by the absolute position detector 25 in step S2 is 45°. When initialization is completed in step S3, the amount of rotation of the ring 27 that is offset from 45° is calculated using the output of the displacement detector 24. For example, when the ring 27 is rotated by 0.5°, the displacement detector 24 outputs the amount of rotation, i.e., 0.5°, and a relative value addition unit 31 in the ring position generator 26 adds 0.5° to 45° stored in the storage region 32, and generates a value of 45.5. In this way, the relative value addition unit 31 in the ring position generator 26 adds an output of the displacement detector 24 to a value stored in the storage region 32 to generate a ring position.

The lens control unit 19 outputs a control value based on the generated ring position (step S5), and the lens driving unit 20 moves a lens 34 to the corresponding position via a lens drive motor 33 (step S6). For the convenience of illustration, if one movable end of the lens 34 is indicated by a value of 0 and the other movable end is indicated by a value of 100, a lens position L ($0 \leq L \leq 100$) with respect to a ring position $\theta$ ($0 \leq \theta \leq 90°$) is given by Eq. (4):

$$L = \theta\_to\_L(\theta) = (100 - 0) \times \theta/(90 - 0) \qquad \text{Eq. (4)}$$

For example, the lens 34 may be a zoom lens with the "wide" end having a value of 0 and the "tele" end having a value of 100 or with the "tele" end having a value of 0 and the "wide" end having a value of 100. The lens 34 may be a focus lens with the "far" end having a value of 0 and the "near" end having a value of 100 or with the "near" end having a value of 0 and the "far" end having a value of 100. A selector allows the relation between the rotation direction of the ring 27 and the movement direction of the lens 34 to change over, as desired by the user.

It is determined further whether or not the amount of displacement is discontinuous and a value jump occurs (step S7). Specifically, the ring position generator 26 monitors outputs of the displacement detector 24, and determines that a value jump occurs when the amount of displacement becomes discontinuous.

If it is determined in step S7 that the amount of displacement is discontinuous, the initialization processing is performed again (step S8). Specifically, the ring position generator 26 sets the angle of rotation detected by the absolute position detector 25 in step S2 as the initial position, and initialization is completed in step S3.

If it is determined in step S7 that the amount of displacement is not discontinuous, the lens driving processing of step S6 is performed continuously (step S9).

The ring rotation position generator according to the present embodiment also may be used for an iris drive control operation, described below, in addition to the lens drive control operation described above.

Figure 3:
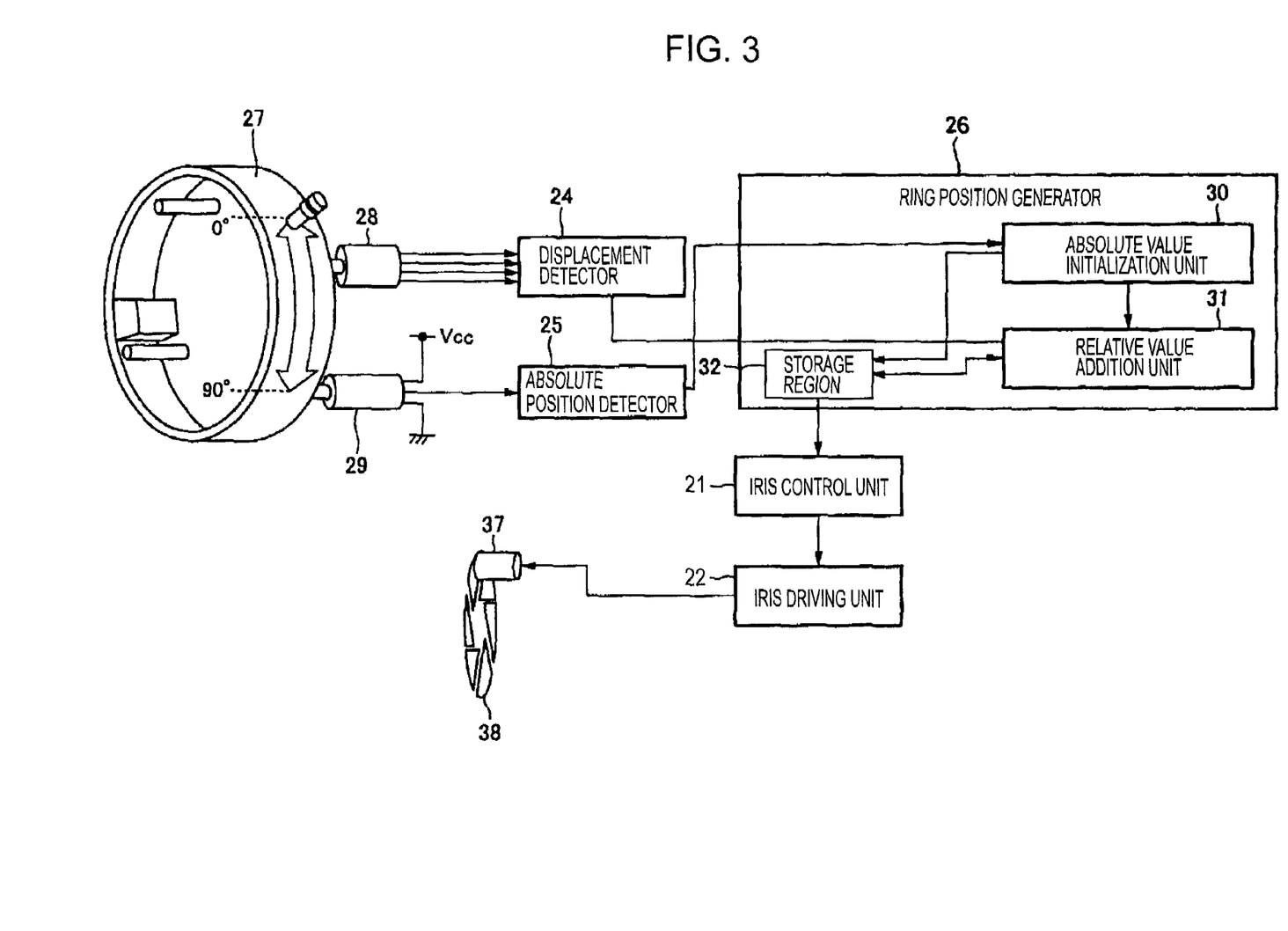
FIG. 3 is a diagram showing an iris driving system to show the iris driving operation of the ring position generator.

FIG. 3 shows the iris driving operation of the ring rotation position generator.

The system shown in FIG. 3 is the same as that shown in FIG. 2, except for an iris control unit 21 and an iris driving unit 22 in place of the lens control unit 19 and the lens driving unit 20, and an iris drive motor 37 and an iris 38 in place of the lens drive motor 33 and the lens 34.

The iris driving operation of the ring rotation position generator shown in FIG. 3 will be described by referring again to the FIG. 9.

In FIG. 9, first, it is determined whether or not initialization is completed (step S1). If it is determined in step S1 that initialization is not completed, the ring position is set as the absolute position detector output (step S2), and initialization is completed (step S3). Specifically, the ring position generator 26 includes the storage region 32 when the ring position generator 26 generates a value corresponding to the angle of rotation of the ring 27. Thus, the storage region 32 stores the value corresponding to the angle of rotation of the ring 27. If the storage region 32 is not defined, for example, when the imaging device is turned on, the absolute value initialization unit 30 in the ring position generator 26 initializes the storage region 32 using the angle of rotation detected by the absolute position detector 25.

If it is determined in step S1 that initialization is completed, the displacement detector output is added to the ring position (step S4). Specifically, for example, the angle of rotation detected by the absolute position detector 25 in step S2 is 45°. When initialization is completed in step S3, the amount of rotation of the ring 27 that is offset from 45° is calculated using the output of the displacement detector 24. For example, when the ring 27 is rotated by 0.5°, the displacement detector 24 outputs the mount of rotation, i.e., 0.5°, and the relative value addition unit 31 in the ring position generator 26 adds 0.5° to 45° stored in the storage region 32, and generates a value of 45.5. In this way, the relative value addition unit 31 in the ring position generator 26 adds an output of the displacement detector 24 to a value stored in the storage region 32 to generate a ring position.

The iris control unit 21 outputs a control value based on the generated ring position (step S5), and the iris driving unit 22 moves the iris 38 to the corresponding opening/closing position via the iris drive motor 37 (step S6). For convenience of the illustration, if the opening/closing position of one movable end of the iris 38 is indicated by a value of 0, and the opening/closing position of the other movable end is indicated by a value of 100, an iris opening/closing position L ($0 \leq L \leq 100$) with respect to a ring position θ ($0 \leq \theta \leq 90°$) is given by Eq. (4) noted above. The calculation and the control methods in this case are the same as those described with reference to FIG. 2, except that the object to be controlled changes from the lens 34 to the iris 38.

It is further determined whether or not the amount of displacement is discontinuous and a value jump occurs (step S7). Specifically, the ring position generator 26 monitors outputs of the displacement detector 24, and determines that a value jump occurs when the amount of displacement becomes discontinuous.

If it is determined in step S7 that the amount of displacement is discontinuous, the initialization processing is performed again (step S8). Specifically, the ring position generator 26 sets the angle of rotation detected by the absolute position detector 25 in step S2 as the initial position, and initialization is completed in step S3.

If it is determined in step S7 that the amount of displacement is not discontinuous, the iris driving processing of step S6 is performed continuously (step S9).

Figure 10A:
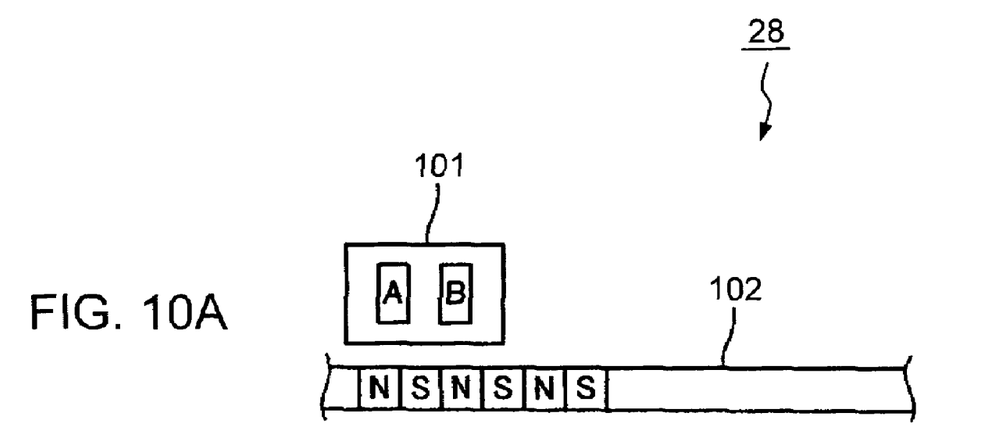
FIGS. 10A and 10B are illustrations of a MR encoder and a potentiometer, respectively.
Figure 10B:
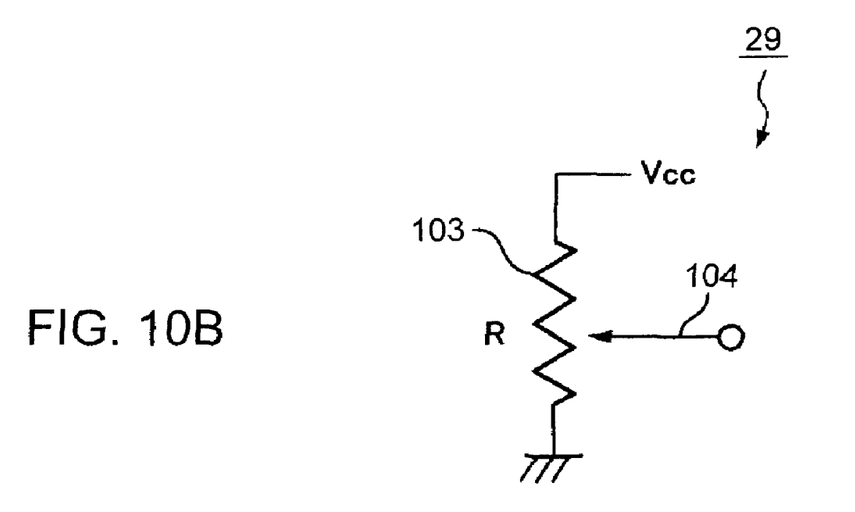

FIGS. 10A and 10B are illustrations of the MR encoder 28 and the potentiometer 29, respectively.

When an object to be detected that is magnetized, moves with respect to a MR detector 101, the MR encoder 28 detects a change in position based on a change in resistance of the MR detector 101 due to the magnetoresistance effect.

When an object to be detected having a fixed movable end 104 moves with respect to a resistor 103 that is pulled up by a voltage Vcc, the potentiometer 29 detects a change in position based on a change of a divided voltage as the resistance of the resistor 103 changes.

The MR encoder 28 and the potentiometer 29 are merely examples, and other sensors may be used.

Figure 7:
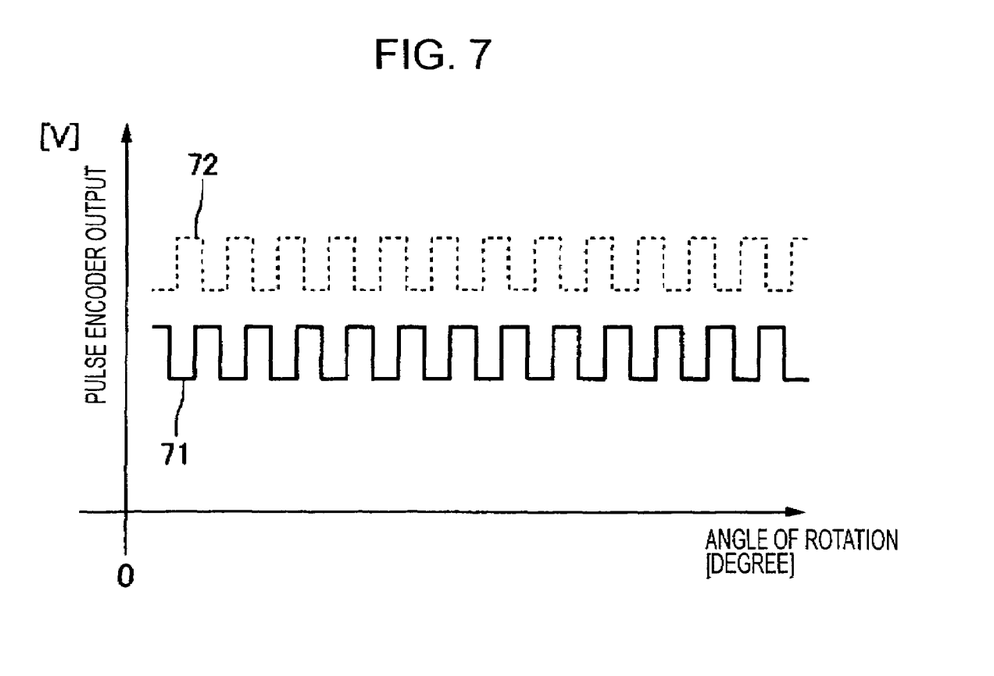
FIG. 7 is a diagram showing a pulse encoder output.

As a modification, instead of the MR encoder 28, for example, a pulse encoder that provides the two-phase pulse outputs 71 and 72 shown in FIG. 7 may be used as a displacement sensor.

Figure 8:
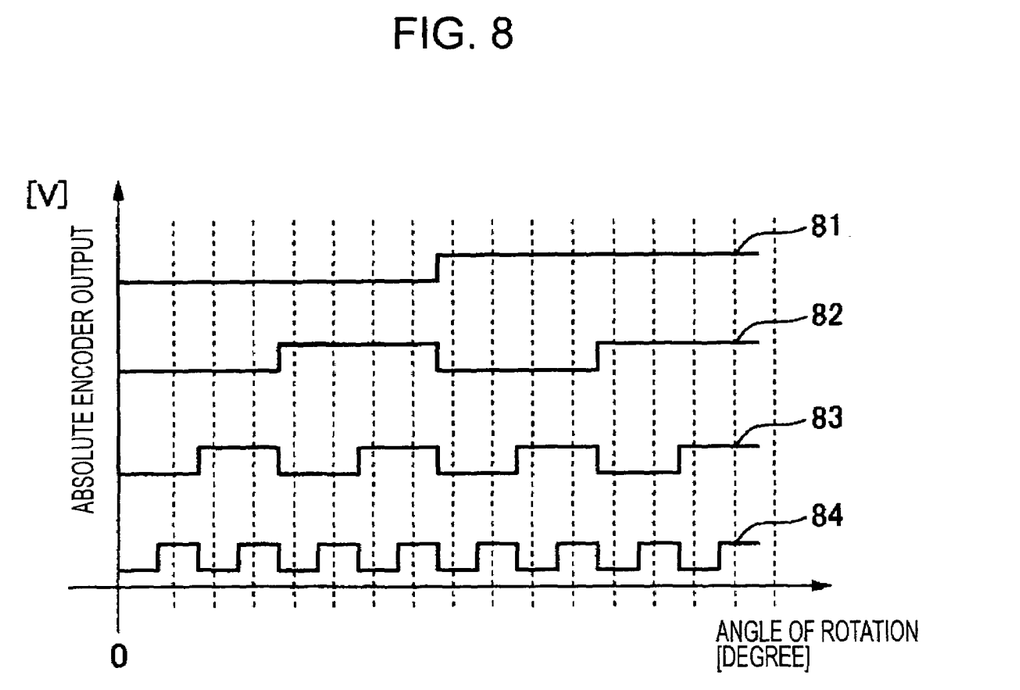
FIG. 8 is a diagram showing an absolute encoder output.

Instead of the potentiometer 29, an absolute encoder that provides a plurality of outputs 81, 82, 83, and 84 having different detection accuracies, as shown in FIG. 8, may be used as an absolute position sensor. FIG. 8, shows an absolute encoder that provides 4-bit output.

While the control mechanism for the lens driving system and the iris driving system has been described, this control mechanism also may be applied to other objects to be controlled that are driven by a motor.

This control mechanism also may be applied not only to an operating unit driven rotatably but also to a wide variety of operating units driven linearly by linear stepping motors. In this case, instead of a rotary encoder, a linear encoder may be used with the intervention of a mechanism for converting a rotation of the ring into a linear movement.

Other than the structure with the intervention of gears or link mechanisms, for example, it also can be conceived that resistors are disposed along the curve of the ring and the potentiometer function is embedded in the resistors. The objects to be driven may include optical components other than lenses.

It should be understood by those skilled in the art that various modifications, combinations, subcombinations and alterations may occur depending on design requirements and other factors insofar as they are within the scope of the appended claims or the equivalents thereof.

What is claimed is:

1. An imaging device for picking up an image of an object via an optical system and recording image information in a recording medium, a driving system for the optical system being controlled according to a position of an operating unit, the imaging device comprising:

a motor driving an object to be controlled by the driving system;

a driver driving the motor;

absolute position detecting means for detecting a relatively-low-resolution absolute position of the operating unit;

relative position detecting means for detecting a relatively-high-resolution relative position of the operating unit;

position generating means for generating a position output corresponding to a position in a restricted range of movement of the operating unit using a combination of the absolute position detected by the absolute position detecting means and the relative position detected by the relative position detecting means;

wherein the position generating means first initializes a value in a storage region storing the generated position output based on the absolute position detected by the absolute position detecting means;

wherein the position generating means, after the initialization, increases or decreases the value in the storage region based on a signal from the relative position detecting means;

wherein, if it is determined that the value in the storage region is not defined, the value in the storage region is set as the operating unit position as outputted from the absolute detecting means; and control means for controlling the motor via the driver to drive the object to be controlled according to the generated position output of the operating unit.

2. The imaging device according to claim 1, wherein the position generating means includes absolute value initializing means using the absolute position detected by the absolute position detecting means as an initial value, and relative value adding means for adding the relative position detected by the relative position detecting means to the initial value.

3. The imaging device according to claim 2, wherein the position generating means uses the absolute position detected by the absolute position detecting means as the initial value again when the relative position detected by the relative position detecting means becomes discontinuous.

4. A method for driving an optical system in an imaging device for picking up an image of an object via the optical system and recording image information in a recording medium, a driving system for the optical system being controlled according to a position of an operating unit, the method comprising the steps of:

detecting a relatively-low-resolution absolute position of the operating unit;

detecting a relatively-high-resolution relative position of the operating unit;

generating a position output corresponding to a position in a restricted range of movement of the operating unit using a combination of the absolute position detected in the step of detecting the absolute position and the relative position detected in the step of detecting the relative position;

initializing a value in a storage region storing the generated position output based on the absolute position detected in the step of detecting the absolute position;

increasing or decreasing the value in the storage region based on a signal from the relative position detecting means after the initialization;

setting the value in the storage region as the operating unit position as outputted from the absolute detecting means value if it is determined that the value in the storage region is not defined;

controlling a motor via a driver to drive an object to be controlled by the driving system according to the generated position output of the operating unit; and driving the object to be controlled by the driving system using the motor.

5. The method according to claim 4, wherein the step of generating a position output includes the steps of using the absolute position detected in the step of detecting the absolute position as an initial value, and adding the relative position detected in the step of detecting the relative position to the initial value.

6. The method according to claim 5, wherein the step of generating a position output uses the absolute position detected in the step of detecting the absolute position as the initial value again when the relative position detected in the step of detecting the relative position becomes discontinuous.

7. An imaging device for picking up an image of an object via an optical system and recording image information in a recording medium, a driving system for the optical system being controlled according to a position of an operating unit, the imaging device comprising:

a motor driving an object to be controlled by the driving system;

a driver driving the motor;

an absolute position detecting unit detecting a relatively-low-resolution absolute position of the operating unit;

a relative position detecting unit detecting a relatively-high-resolution relative position of the operating unit;

a position generating unit generating a position output corresponding to a position in a restricted range of movement of the operating unit using a combination of the absolute position detected by the absolute position detecting unit and the relative position detected by the relative position detecting unit;

wherein the position generating means first initializes a value in a storage region storing the generated position output based on the absolute position detected by the absolute position detecting means;

wherein the position generating means, after the initialization, increases or decreases the value in the storage region based on a signal from the relative position detecting means;

wherein, if it is determined that the value in the storage region is not defined, the value in the storage region is set as the operating unit position as outputted from the absolute detecting means; and a control unit controlling the motor via the driver to drive the object to be controlled according to the generated position output of the operating unit.

\* \* \* \* \*